US008873721B2

(12) United States Patent
Redfern et al.

(10) Patent No.: US 8,873,721 B2
(45) Date of Patent: Oct. 28, 2014

(54) METHODS AND SYSTEMS FOR NAME PRONUNCIATION

(71) Applicants: Jonathan Redfern, Truckee, CA (US); Manish Mohan Sharma, San Jose, CA (US); Seth McLaughlin, Palo Alto, CA (US)

(72) Inventors: Jonathan Redfern, Truckee, CA (US); Manish Mohan Sharma, San Jose, CA (US); Seth McLaughlin, Palo Alto, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/626,501

(22) Filed: Sep. 25, 2012

(65) Prior Publication Data

US 2014/0086395 A1 Mar. 27, 2014

(51) Int. Cl.
*H04M 1/64* (2006.01)

(52) U.S. Cl.
USPC .................... 379/88.01; 379/88.12

(58) Field of Classification Search
USPC .............. 379/88.01; 709/206; 434/169
See application file for complete search history.

(56) References Cited

U.S. PATENT DOCUMENTS

| 8,539,031 B2* | 9/2013 | Comertoglu et al. | 709/206 |
| 2002/0112005 A1* | 8/2002 | Namias | 709/206 |
| 2011/0250570 A1* | 10/2011 | Mack | 434/169 |

* cited by examiner

*Primary Examiner* — Fan Tsang
*Assistant Examiner* — Van D Huynh
(74) *Attorney, Agent, or Firm* — Schwegman Lundberg & Woessner, P.A.

(57) ABSTRACT

In an embodiment, a system maintains a database of a plurality of persons. The database includes an audio clip of a pronunciation of a name of a first person in the database. The system determines from a calendar database that a second person has an event in common with the first person, and transmits to a device associated with the second person an indication that the database includes the pronunciation of the name of the first person.

27 Claims, 8 Drawing Sheets

USER NAME: _____
PASSWORD: _____

*Fig. 5A*

CLICK HERE TO SUBMIT CORRECT
PRONUNCIATION OF YOUR NAME

*Fig. 5B*

METHODS AND SYSTEMS FOR NAME PRONUNCIATION

TECHNICAL FIELD

The present disclosure generally relates to data processing systems. Specifically, the present disclosure relates to methods, systems and computer storage devices for providing a pronunciation of a person's name, and more specifically, for providing the pronunciation of a person's name who is a member or user of an email system and/or a social or business networking system.

BACKGROUND

In today's global business and social networking world, people from all over the globe interact with people from many different countries and cultures. Additionally, people from all over the world relocate to other countries and cultures for business, educational, cultural, and social reasons. Consequently, people are connected to people from many different cultures or countries that may be foreign to them. In many cases, a slight to severe language barrier may exist between these peoples, and such a barrier may include something as simple as the correct pronunciation of a person's name.

DESCRIPTION OF THE DRAWINGS

Some embodiments are illustrated by way of example and not limitation in the FIG's. of the accompanying drawings, in which:

FIGS. 5A and 5B are an examples of user interfaces for prompting a person to provide the correct pronunciation of his or her name upon logging on to an email system or a social or business networking system.

DETAILED DESCRIPTION

The present disclosure describes methods, systems, and computer storage devices for providing the correct pronunciation of a person's name. In an embodiment, the person whose name is being correctly pronounced is a member or user of an email system, a social networking system, or a business networking system. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Figure 1:
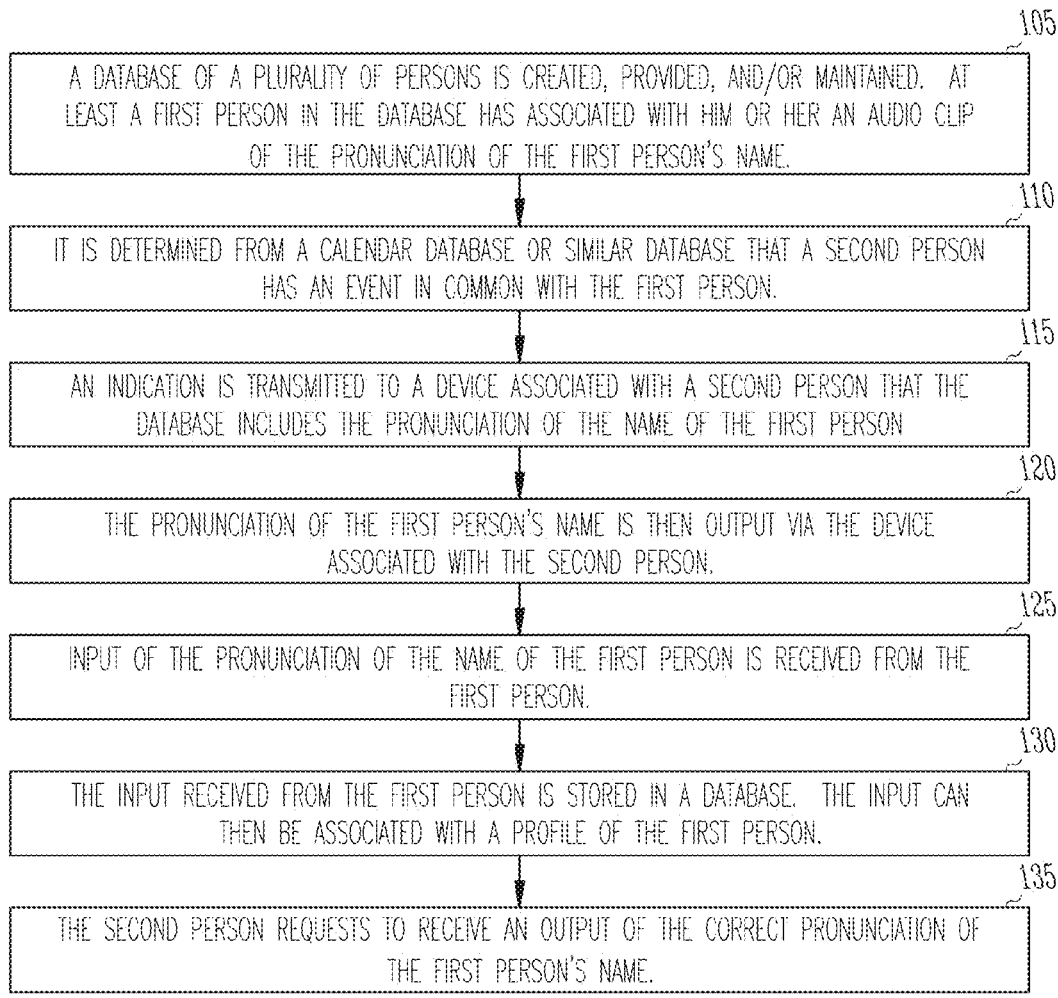
FIG. 1 is a flowchart of a method to provide the correct pronunciation of a person's name.

In an embodiment, a system, a method, and a computer storage device 100 provide a correct pronunciation of a person's name. The embodiment is described in connection with FIGS. 1 and 2, which respectively illustrate a flowchart-like diagram of a method to provide the correct pronunciation of a person's name, and a block diagram of features of a system to provide the correct pronunciation of a person's name. FIG. 1 includes a number of process blocks 105-135. Though arranged serially in the example of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations. With some embodiments, some of the method operations illustrated in FIG. 1 may be performed offline by means of a batch process that is performed periodically (e.g., two times a day, daily, weekly, and so forth), while in other embodiments, the method operations may be performed online and in real-time as requests for correct name pronunciations and similar member profiles are being received and processed. In addition, some profile features may include data received from a data source external to an email system or a social or business networking service. Accordingly, an audio clip of the correct pronunciation of a person's name (or data associated with such an audio clip) and data from a member's profile (e.g., a name, or other identifying data) may be used to query an external data source for additional information about the member.

Referring now specifically to FIG. 1, at 105, a database of a plurality of persons is created, provided, and/or maintained. In an embodiment, the database is a stand-alone database. In another embodiment, the database is part of another system such as a profile in an email system or a social or business networking system. Consistent with embodiments of the invention that are used in connection with a social or business networking service, and as described in detail throughout this disclosure, a social or business networking service includes member profiles, and in an embodiment, the necessary logic to identify member profiles for a variety of reasons, such as identifying member profiles that are similar to a given member profile. In yet another embodiment, the database is either a stand-alone database or a database that is part of another system, and it is further linked to the other system via a network or other similar means. In any of these embodiments, the database includes audio clips of pronunciations of names of persons in the database, although all persons in the database need not have an audio clip associated with them. However, in a typical embodiment, at least a first person in the database has associated with him or her an audio clip of the pronunciation of the first person's name.

At 110, it is determined from a calendar database or similar database that a second person has an event in common with the first person. The calendar database can be part of the database referred to in the previous paragraph, or it can be a separate database. At 115, an indication is transmitted to a device associated with a second person that the database includes the pronunciation of the name of the first person. This indication can be in any form known to those of skill in the art, such as an instant message, an email message, an audible signal played at a device associated with the second person, or other indication. At 120, the pronunciation of the first person's name is then output via the device associated with the second person. The pronunciation output can be automatic, such as in connection with an instant message, or it can be in response to some action by the second person, such as clicking on a user interface element or reading an email message.

Figure 2A:
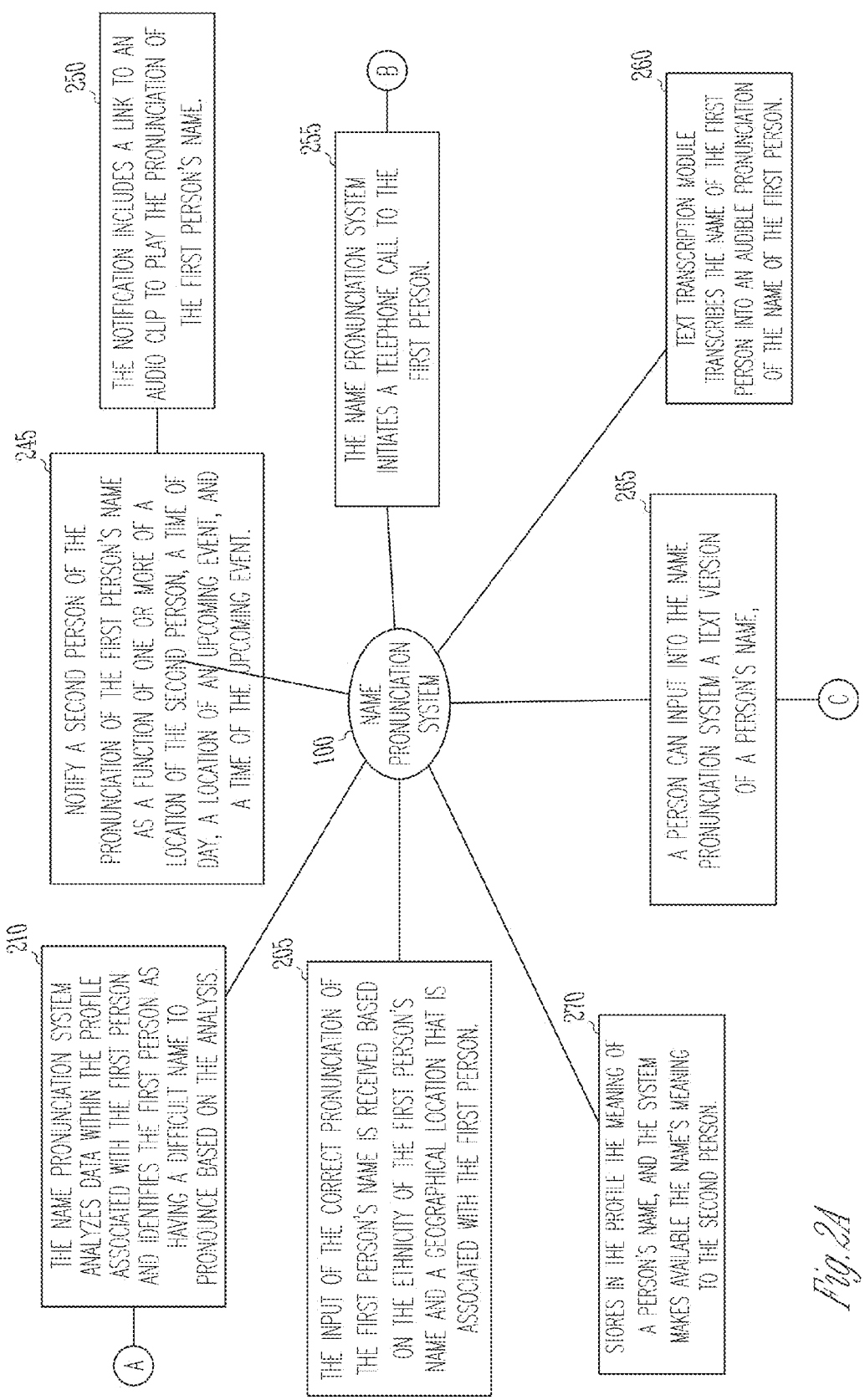
FIGS. 2A and 2B are a block diagram of several features of a system and a method to provide the correct pronunciation of a person's name.
Figure 2B:
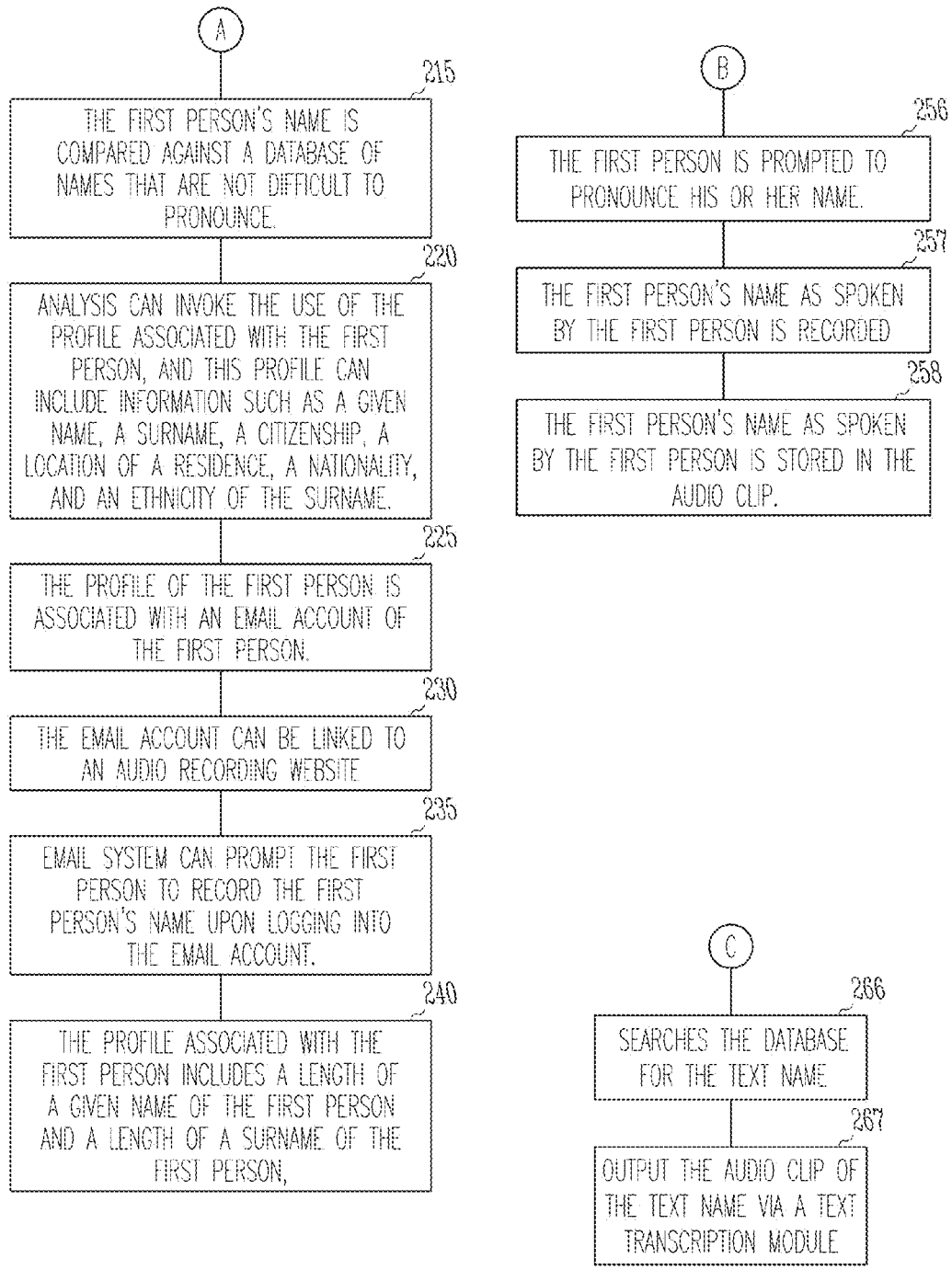

In another embodiment, the system, method, or computer storage device allows for the first person to provide the correct pronunciation of his or her name. Specifically, as illustrated at 125, input of the pronunciation of the name of the first person is received from the first person. As indicated below, this input can be received in several different ways. Referring to FIG. 2, at 205, the input of the correct pronunciation of the first person's name is received based on the ethnicity of the first person's name and a geographical location that is associated with the first person. For example, if the name of the first person is of Russian origin, and the first person is living and working in another country that is not familiar with Russian names, that person will be requested, encouraged, and/or required to provide the correct pronunciation of his or her name. In an embodiment, after supplying the correct pronunciation of his or her name, the pronunciation of the first person's name as provided by the first person can be played back to the first person. The first person can then either indicate that the pronunciation is acceptable, at which point the pronunciation will be stored as the audio clip, or the first person can indicate that he or she would like to re-pronounce his or her name before it is stored as the audio clip. In another embodiment, the first person is permitted to record and store an alternate pronunciation(s) of his or her name.

At 130, the input received from the first person is stored in a database. The input can then be associated with a profile of the first person. The database or profile can be part of an email system, an online social network, or an online business network. The general structure and features of an online social or business network are described below in connection with FIGS. 3 and 4.

At 135, the second person requests to receive an output of the correct pronunciation of the first person's name. As noted above, this request can be via any form known to those skilled in the art that is associated with a device, and in particular a mobile device, of the second person.

As indicated above, at 205, the input of the correct pronunciation of the first person's name is received based on the ethnicity of the first person's name and a geographical location that is associated with the first person. In another embodiment, as illustrated at 210, the name pronunciation system analyzes data within the profile associated with the first person and identifies the first person as having a difficult name to pronounce based on the analysis. This analysis can take one or more of several forms. For example, at 215, the first person's name is compared against a database of names that are not difficult to pronounce. For example, for persons living in the United States, names such as Brown, Smith, and Jones are not considered difficult to pronounce, so such names would not necessarily have an audio clip associated with them. However, in other portions of the world, names that are considered common or easy to pronounce in the United States may be considered difficult to pronounce in other parts of the world. Such factors and considerations can be programmed into the name pronunciation system. As indicated at 220, this analysis can invoke the use of the profile associated with the first person, and this profile can include information such as a given name, a surname, a citizenship, a location of a residence, a nationality, and an ethnicity of the surname. With this profile information, the name pronunciation system can, for example, compare the surname of the person and the residence of the person. So once again, if the person's profile indicating a Russian surname also indicates that that person has a residence in Des Moines, Iowa, this could indicate that the pronunciation of the person's name should be provided. As another example, the system can determine if the first person's name has a string of multiple consecutive consonants, which the system can then flag as difficult to pronounce. As indicated at 225, the profile of the first person is associated with an email account of the first person. In such an embodiment where the person's profile is linked to a person's email account, the email account can be linked to an audio recording website, as indicated at 230. Such an audio recording website can record the correct pronunciation of the person's name, and store the recordation of the person's name in the audio clip. At 235, such an email system can prompt the first person to record the first person's name upon logging into the email account. In another embodiment, the profile associated with the first person includes a length of a given name of the first person and a length of a surname of the first person, as indicated at 240. Using this information, the name pronunciation system can determine which names may be considered difficult to pronounce, with the assumption that longer names are generally more difficult to pronounce than shorter names.

At 245, the name pronunciation system can notify a second person of the pronunciation of the first person's name as a function of one or more of a location of the second person, a time of day, a location of an upcoming event, and a time of the upcoming event. In a particular embodiment, this can be implemented using a calendar system. A typical calendar system is associated with an email system or a social or business networking system, and records appointments, and reminds system users of those appointments. At 250, the notification includes a link to an audio clip to play the pronunciation of the first person's name.

In another embodiment, the name pronunciation system can include a coupling to an automatic telephone system. Specifically, at 255, the name pronunciation system initiates a telephone call to the first person. At 256, the first person is prompted to pronounce his or her name. At 257, the first person's name as spoken by the first person is recorded, for example, in the above-mentioned database. At 258, the first person's name as spoken by the first person is stored in the audio clip.

In yet another embodiment, the name pronunciation system includes a text transcription module. Specifically, at 260, the text transcription module transcribes the name of the first person into an audible pronunciation of the name of the first person. This transcription is normally a machine implemented pronunciation. The text transcription module can then store the audible pronunciation of the name of the first person in the audio clip.

In yet another embodiment, the database can be independently queried for the correct pronunciation of a name, without any coupling or connection to an email system or a calendar system. For example, as indicated as 265, a person can input into the name pronunciation system a text version of a person's name, geographic name, or any other word. The name pronunciation system then searches the database for the text name at 266. At 267, the name pronunciation system outputs the audio clip of the text name via a text transcription module.

At 270, the name pronunciation system stores in the profile the meaning of a person's name, and the system makes available the name's meaning to the second person. For example, in some cultures, people are not given names that serve only as names for persons (such as Peter, David, Johnathan, etc., although even these names can have some meaning associated with them, such as "beloved" for David). Rather, they are given names using a combination of one or more words from the language or culture (such as "strong", "big", and "man", such that a person's name may literally mean "big strong man"). In either or any situation, the name pronunciation system can be configured to provide to users of the system the meanings of names.

Figure 3:
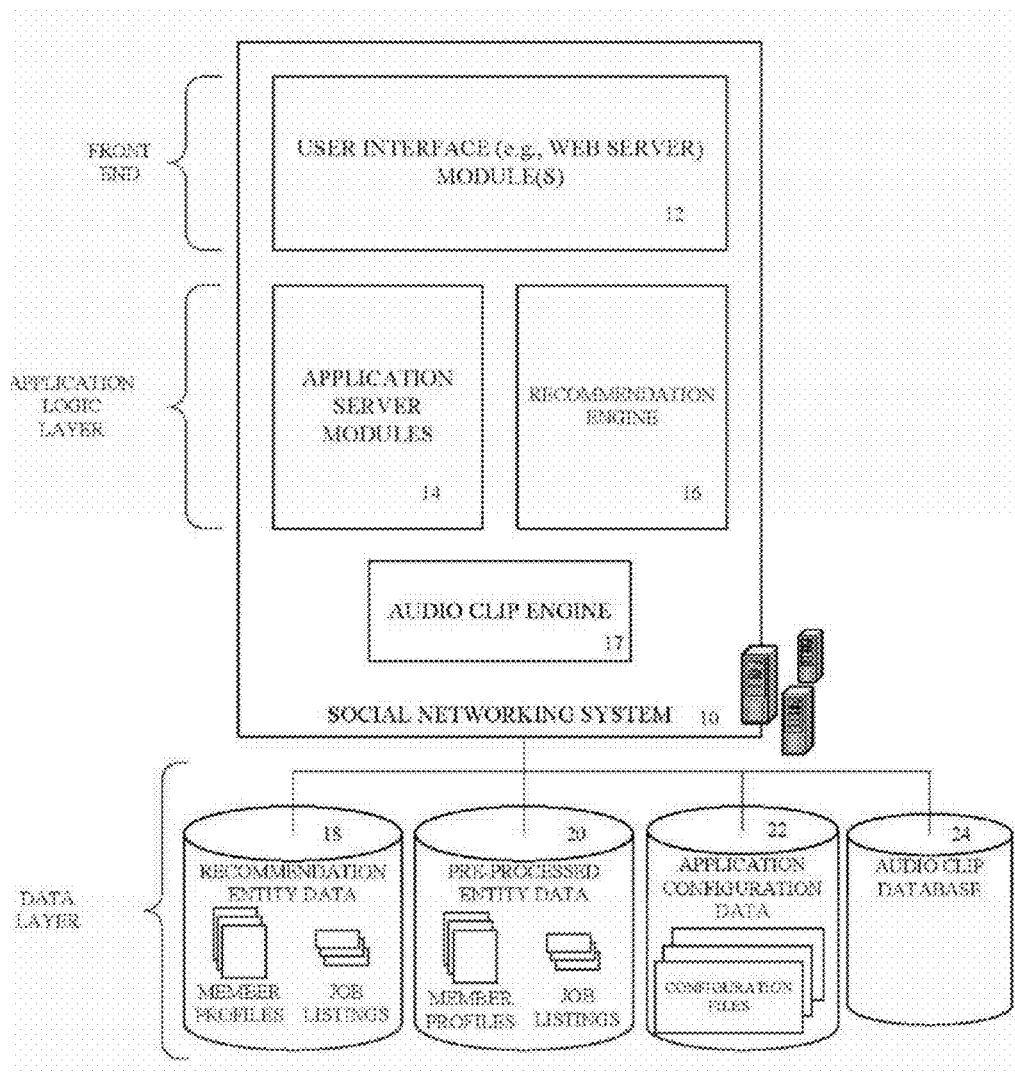
FIG. 3 is a block diagram illustrating various components of a social networking service including an audio clip engine and a recommendation engine, consistent with some embodiments of the invention, for outputting the correct pronunciation of a person's name and for identifying similarities between different entity types, such as member profiles, job listings, groups, and so forth.

FIG. 3 is a block diagram illustrating various components of a social or business networking system 10 with an audio clip database 24 and an audio clip engine 17 for reading from and writing to the audio clip database 24. The social or business networking system 10 can further include entity types (e.g., such as member profiles, job listings, groups, advertisements, and so forth), consistent with some embodiments of the invention. As shown in FIG. 3, the social or business networking system 10 is generally based on a three-tiered architecture, consisting of a front-end layer, application logic layer, and data layer. As is understood by skilled artisans in the relevant computer and Internet-related arts, each module or engine shown in FIG. 3 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 3. However, a skilled artisan will readily recognize that various additional functional modules and engines may be used with a social or business networking system such as that illustrated in FIG. 3 to facilitate additional functionality that is not specifically described herein. Furthermore, the various functional modules and engines depicted in FIG. 3 may reside on a single server computer, or may be distributed across several server computers in various arrangements.

As shown in FIG. 3, the front end consists of a user interface module (e.g., a web server) 12, which receives requests from various client computing devices, and communicates appropriate responses to the requesting client devices. For example, the user interface module(s) 12 may receive requests in the form of Hypertext Transport Protocol (HTTP) requests, or other web-based, application programming interface (API) requests. The application logic layer includes various application server modules 14, which, in conjunction with the user interface module(s) 12, generate various user interfaces (e.g., web pages) with data retrieved from various data sources in the data layer. With some embodiments, individual application server modules 14 are used to implement the functionality associated with various services and features of the social networking service. For instance, the ability to identify member profiles similar to a user-selected source member profile—a service that may be recognized by the name, "People Like This" or "Profiles Similar to This"—may be a service implemented in an independent application server module 14. A recommendation engine 16 can identify similarities between different recommendation entity types (e.g., such as member profiles, job listings, groups, advertisements, and so forth), consistent with some embodiments of the invention. The name pronunciation system can be implemented via the audio clip engine, which can be implemented as a stand alone audio clip engine 17 or which can be embodied in the application server modules 14.

As shown in FIG. 3, the data layer includes several databases, such as a database 18 for storing recommendation entity data, for example, such as member profiles, job listings, interest groups, companies, advertisements, events, news, discussions, tweets, questions and answers, and so forth. With some embodiments, the recommendation entity data is processed in the background (e.g., offline) to generate pre-processed entity data that can be used by the recommendation engine, in real-time, to make recommendations generally, and to identify member profiles similar to a source member profile, specifically. For example, the recommendation engine 16 may retrieve and process member profile data in the database with reference number 20 to identify member profiles similar to a source member profile. The database with reference number 22 in FIG. 3 is shown to be storing application configuration data, including one or more configuration files for use with the recommendation engine 16.

Consistent with some embodiments, when a person initially registers to become a user of an email system or a member of a social or business networking service, the person will be prompted to provide the correct pronunciation of his or her name, along with some personal information, such as his or her age (e.g., birthdate), gender, interests, contact information, home town, address, the names of the member's spouse and/or family members, educational background (e.g., schools, majors, etc.), employment history, skills, professional organizations, and so on. The correct pronunciation of the person's name can be provided to the audio clip engine 17, and can be stored in the audio clip database 24. The personal information can be stored, for example, in the database with reference number 18.

Once registered on the social or business networking system 10, a member may invite other members, or be invited by other members, to connect via the social or business networking service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. These configurations may affect whether or not a correct pronunciation of a person's name is available to another member of the social or business networking system 10.

The social or business networking service may provide a broad range of other applications and services that allow members the opportunity to share and receive information, often customized to the interests of the member. For example, with some embodiments, the social or business networking service may include a photo sharing application that allows members to upload and share photos with other members. With some embodiments, members may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members. With some embodiments, members may be allowed to subscribe to receive information concerning companies other than the company with which they are employed. With many of these applications and services, one or more recommendation entities are involved. For instance, in addition to identifying member profiles that are similar to a source member profile, the recommendation engine 16 may be configured and customized to identify groups, companies or photos that are likely to be of interest to a particular member. As noted in the previous paragraph, these different features and configurations may affect the functionality of the name pronunciation feature.

Figure 4:
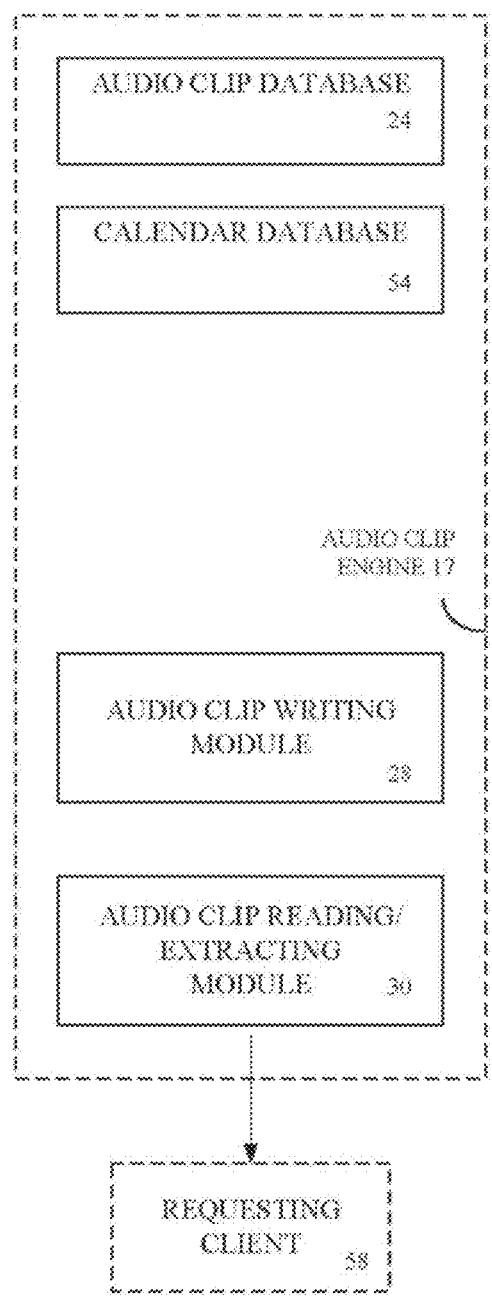
FIG. 4 is a block diagram showing some of the components or modules that comprise a name pronunciation system, consistent with some embodiments of the invention, and illustrates the flow of data that occurs when performing various portions of a method for providing the correct pronunciation of a person's name.

FIG. 4 is a block diagram showing some of the functional components or modules that comprise an audio clip engine 17 that is configured for writing to and reading from the audio clip database 24, both of which function together to provide a correct pronunciation of a person's name. As illustrated in FIG. 4, the audio clip engine 17 consists of two primary functional modules—an audio clip writing module 28 and an audio clip reading/extraction module 30. As indicated above, a person may be prompted to enter a correct pronunciation of his or her name (for example, when a user becomes a new user of the system, the person logs onto his or her email account, and/or a person logs onto his or her social/business networking account). The audio clip extraction module 30 operates to extract the correct pronunciation of a person's name, and transmits it to another person's device so that that other person can play the correct pronunciation. As indicated above, the audio clip extraction module can execute based on a request from a user, or can function automatically based on a location and time relationship between the person whose name is difficult to pronounce and the user who has an upcoming contact with the person whose name is difficult to pronounce. The audio clip engine 17 can further access a calendar database 54, which as explained above can determine when a notice is sent to the user regarding the pronunciation of a person's name.

With some embodiments, the client 58 of the audio clip engine 17 may simply be a server-side application that is requesting the information from the audio clip engine 17 (such as may be the case when the name pronunciation system automatically provides a correct name pronunciation to a user or member of the system based on an upcoming event).

Figure 6:
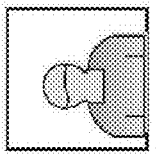
FIG. 6 is an example of a user interface for providing notification that a correct pronunciation of a person's name is available, and further providing an interface for a user to select and play the correct pronunciation of the person's name

FIGS. 5A, 5B, and 6 are user interface illustrations showing an example of a person being prompted to provide the correct pronunciation of his or her name upon logging on to an email system or a social or business networking system, and notification that a correct pronunciation of a person's name is available, and further providing an interface for a user to select and play the correct pronunciation of the person's name. The user interfaces shown in FIGS. 5A, 5B, and 6 could be representative of a web page, but could also be presented via another application (e.g., such as on a mobile device, phone or tablet device). The user interface of FIG. 6 illustrates an example of a member profile for a member named, "Dimitri Ludchevoniskanov". In the left portion of the user interface of FIG. 6, member profile information is presented including the member's current job title, industry, current company of employment, prior company of employment, and so forth. If a viewer of the profile (i.e., another member or non-member of the social networking service) would like to see member profiles that are similar to Dimitri Ludchevoniskanov's member profile, the viewer can simply select the link or button labelled, "Find Similar Profiles" with reference number 80. At 82, there is a user interface element indicating that a correct pronunciation for Dimitri Ludchevoniskanov's name is available. While the user interface element 82 in FIG. 6 is part of a social network screen, other embodiments may have user interface element 82 associated with an email system, or as a stand alone instant message embodiment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 7:
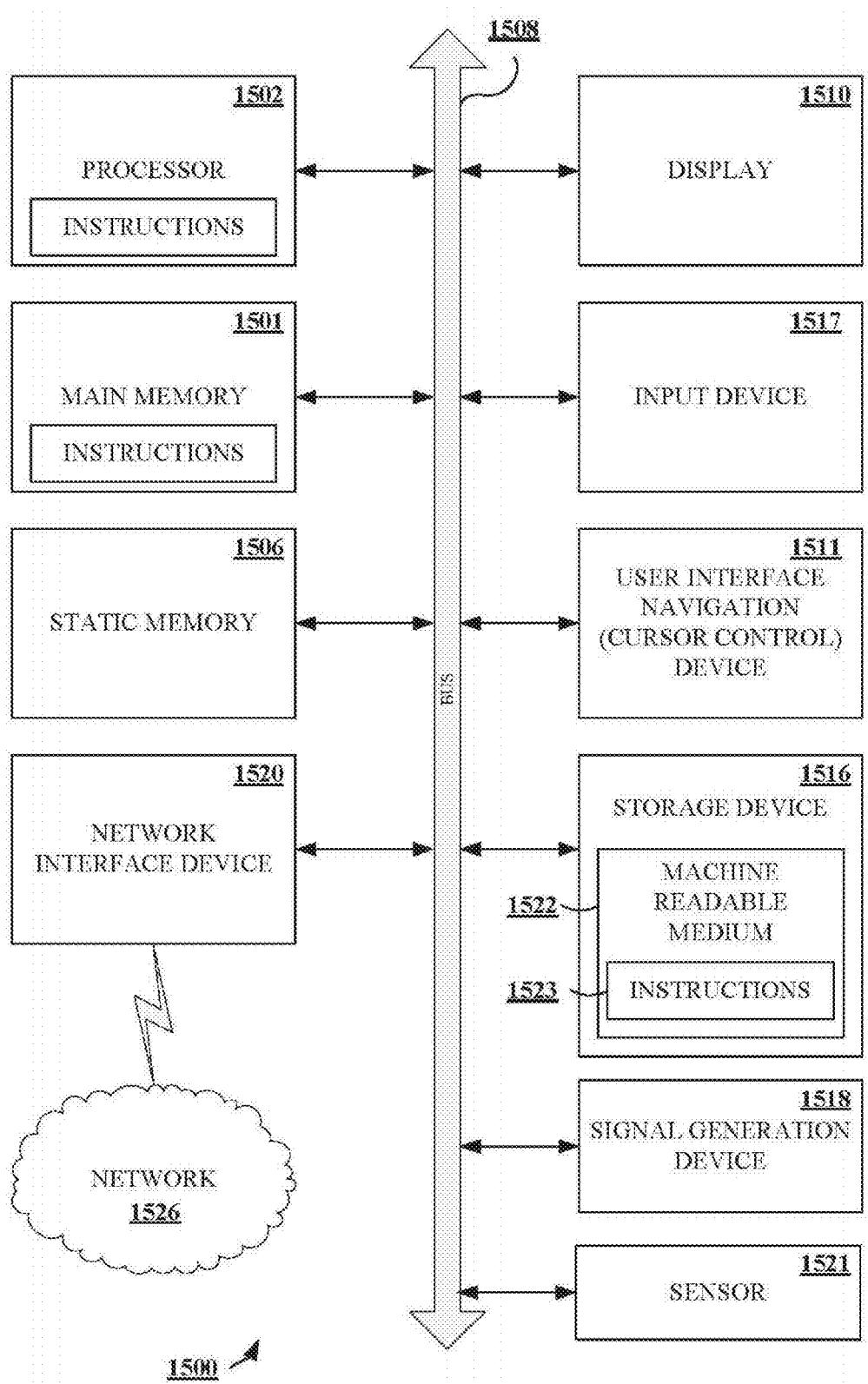
FIG. 7 is a block diagram of a machine in the form of a computing device within which a set of instructions, for causing the machine to perform any one or more of the methodologies discussed herein, may be executed.

FIG. 7 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The invention claimed is:

1. A system comprising:
   a computer processor and a computer storage device configured to:
   maintain a database of a plurality of persons, the database comprising an audio clip of a pronunciation of a name of a first person in the database; compare the first person's name against a database of names, the database of names comprising names that are not difficult to pronounce, and determine that the first person's name is difficult to pronounce,
   determine from a calendar database that a second person has an event in common with the first person; and
   based on a presence of the audio clip in the database for the first person, the determination that the first person's name is difficult to pronounce, and the determination form the calendar database that the second person has the event in common with the first person, transmit to a device associated with the second person an indication that the database includes the pronunciation of the name of the first person.

2. The system of claim 1, wherein the computer processor and computer storage device are configured to output the pronunciation of the first person's name.

3. The system of claim 1, wherein the computer processor and computer storage device are configured to:
   receive input from the first person, the input comprising the pronunciation of the first person's name; and
   store the input in the database as the audio clip, the audio clip associated with a profile of the first person.

4. The system of claim 3, wherein the input is received from the first person as a function of an ethnicity of the person's name and a geographical location associated with the first person.

5. The system of claim 1, wherein the computer processor and computer storage device are configured to receive a request from the second person to output the pronunciation of the first person's name.

6. The system of claim 1, wherein the computer processor is configured to analyze data within a profile associated with the first person and to identify the first person as having a difficult name to pronounce based on the analysis;
   wherein the analysis to determine that a name is difficult to pronounce comprises examining a length of a given name of the first person and a length of a summer of the first person.

7. The system of claim 6, wherein the information in the profile associated with the first person comprises one or more of a given name, a surname, a citizenship, a location of a residence, a nationality, and an ethnicity of the surname.

8. The system of claim 7, wherein the profile is associated with an email account of the first person.

9. The system of claim 8, wherein the email account is linked to an audio recording web site, and wherein the audio recording web site is configured to record the first person's name, and store the recordation of the first person's name in the audio clip.

10. The system of claim 9, wherein the email system is configured to prompt the first person to record the first person's name upon logging into the email account.

11. The system of claim 1, wherein the computer processor is configured to notify a second person of the pronunciation of the first person's name as a function of one or more of a location of the second person, a time of day, a location of an upcoming event, and a start time of the upcoming event.

12. The system of claim 11, wherein the notification includes a link to an audio clip to play the pronunciation of the first person's name.

13. The system of claim 1, wherein the computer processor is configured to:
   initiate a telephone call to the first person;
   prompt the first person to pronounce the first person's name;
   record the first person's name as spoken by the first person; and
   store the first person's name as spoken by the first person in the audio clip.

14. The system of claim 1, wherein the computer processor comprises a text transcription module, and wherein the text transcription module is configured to transcribe the name of the first person into an audible pronunciation of the name of the first person, and store the audible pronunciation of the name of the first person in the audio clip.

15. The system of claim 1, wherein the computer processor is configured to:
   receive text input of a name;
   search the database for the text name; and
   output the audio clip of the text name.

16. The system of claim 1, wherein the database comprises a description of a meaning of the first person's name.

17. A process comprising:
   maintaining a database of a plurality of persons, the database comprising an audio clip of a pronunciation of a name of a first person in the database; compare the first person's name against a database of names, the database of names comprising names that are not difficult to pronounce, and determining that the first person's name is difficult to pronounce;
   determining from a calendar database that a second person has an event in common with the first person; and
   based on a presence of the audio clip in the database for the first person, the determination that the first person's name is difficult to pronounce, and the determination from the calendar database that the second person has the event in common with the first person, transmitting to a device associated with the second person an indication that the database includes the pronunciation of the name of the first person.

18. The process of claim 17, comprising outputting the pronunciation of the first person's name.

19. The process of claim 17, comprising:
   receiving input from the first person, the input comprising the pronunciation of the first person's name; and
   storing the input in the database as the audio clip, the audio clip associated with a profile of the first person.

20. The process of claim 17, comprising receiving a request from the second person to output the pronunciation of the first person's name.

21. The process of claim 17, comprising analyzing data within a profile associated with the first person and identifying the first person as having a difficult name to pronounce based on the analysis;
   wherein the analysis to determine that a name is difficult to pronounce comprises examining a length of a given name of the first person and a length of a surname of the first person.

22. A tangible computer storage device comprising instructions that when executed by a processor execute a process comprising:
   maintaining a database of a plurality of persons, the database comprising an audio clip of a pronunciation of a name of a first person in the database; compare the first person's name against a database of names, the database of names comprising names that are not difficult to pronounce, and determining that the first person's name is difficult to pronounce;
   determining from a calendar database that a second person has an event in common with the first person; and
   based on a presence of the audio clip in the database for the first person, the determination that the first person's name is difficult to pronounce, and the determination from the calendar database that the second person has the event in common with the first person, transmitting to a device associated with the second person an indication that the database includes the pronunciation of the name of the first person.

23. The tangible computer storage device of claim 22, comprising instructions for outputting the pronunciation of the first person's name.

24. The tangible computer storage device of claim 22, comprising instructions for:
   receiving input from the first person, the input comprising the pronunciation of the first person's name; and
   storing the input in the database as the audio clip, the audio clip associated with a profile of the first person.

25. The tangible computer storage device of claim 22, comprising instructions for receiving a request from the second person to output the pronunciation of the first person's name.

26. The tangible computer storage device of claim 22, comprising instructions for analyzing data within a profile associated with the first person and identifying the first person as having a difficult name to pronounce based on the analysis;
   wherein the analysis to determine that a name is difficult to pronounce comprises examining a length of a given name of the first person and a length of a surname of the first person.

27. The system of claim 1, wherein the computer processor is configured to notify a second person of the pronunciation of the first person's name as a function of a location of the second person, a location of an upcoming event, and a start time of the upcoming event.

* * * * *

UNITED STATES PATENT AND TRADEMARK OFFICE
CERTIFICATE OF CORRECTION

PATENT NO.        : 8,873,721 B2                                    Page 1 of 1
APPLICATION NO.   : 13/626501
DATED             : October 28, 2014
INVENTOR(S)       : Redfern et al.

It is certified that error appears in the above-identified patent and that said Letters Patent is hereby corrected as shown below:

In the Claims

In column 10, line 15, in Claim 1, delete "pronounce," and insert --pronounce;--, therefor In column 10, line 21, in Claim 1, delete "form" and insert --from--, therefor In column 10, line 49, in Claim 6, delete "summer" and insert --surname--, therefor Signed and Sealed this
Twenty-second Day of September, 2015

Michelle K. Lee
*Director of the United States Patent and Trademark Office*